US010963157B2

(12) United States Patent
Young et al.

(10) Patent No.: US 10,963,157 B2
(45) Date of Patent: Mar. 30, 2021

(54) OUTDOOR ORDERING SYSTEM WITH INTERACTIVE MENU ELEMENTS

(71) Applicant: LSI Industries Inc., Cincinnati, OH (US)

(72) Inventors: Sharron Young, Doylestown, OH (US); David J. Moeglin, Canton, OH (US); David Ninni, Akron, OH (US); Nick Klein, Columbus, OH (US); David McQueen, Canton, OH (US); Eddie Charusethakarn, Blacklick, OH (US)

(73) Assignee: LSI Industries, Inc., Cincinnati, OH (US)

( * ) Notice: Subject to any disclaimer, the term of this patent is extended or adjusted under 35 U.S.C. 154(b) by 45 days.

(21) Appl. No.: 15/594,136

(22) Filed: May 12, 2017

(65) Prior Publication Data

US 2017/0329513 A1    Nov. 16, 2017

Related U.S. Application Data

(60) Provisional application No. 62/335,394, filed on May 12, 2016.

(51) Int. Cl.
| | | |
|---|---|---|
| *G06F 3/0488* | (2013.01) | |
| *G06F 3/041* | (2006.01) | |
| *G06F 3/01* | (2006.01) | |
| *G06Q 50/12* | (2012.01) | |
| *G06Q 30/06* | (2012.01) | |

(52) U.S. Cl.
CPC .......... *G06F 3/04883* (2013.01); *G06F 3/017* (2013.01); *G06F 3/041* (2013.01); *G06Q 30/0633* (2013.01); *G06Q 50/12* (2013.01)

(58) Field of Classification Search
CPC .... G06Q 30/0633; G06Q 50/12; G06F 3/017; G06F 3/041; G06F 3/04883; A47F 9/02; A47F 9/04; E04H 3/04; E04H 14/00; E05G 7/00
See application file for complete search history.

(56) References Cited

U.S. PATENT DOCUMENTS

| | | | |
|---|---|---|---|
| 6,996,460 B1 * | 2/2006 | Krahnstoever | G06F 3/011 701/1 |
| 7,663,607 B2 * | 2/2010 | Hotelling | G06F 3/0416 345/173 |

(Continued)

FOREIGN PATENT DOCUMENTS

WO    WO-0197206 A1 * 12/2001 ............... G07F 7/00

OTHER PUBLICATIONS

Microchip, "GestIC Design Guide", published on Apr. 11, 2016, [Online] http://ww1.microchip.com/downloads/en/DeviceDoc/40001716C.pdf (Year: 2016).*

*Primary Examiner* — Andrew R Dyer
(74) *Attorney, Agent, or Firm* — Wood Herron & Evans LLP (57) ABSTRACT

An ordering system includes a video display unit operable for displaying contents of a plurality of selectable menu screens and an input pad operable for capturing at least one gesture of a user in at least one direction over the input pad. The gestures are used to select from a plurality of selectable menu screens for display by the video display unit.

15 Claims, 11 Drawing Sheets

(56) References Cited

U.S. PATENT DOCUMENTS

| | | | | |
|---|---|---|---|---|
| 8,970,501 B2* | 3/2015 | Hotelling | G06F 3/041 | 345/173 |
| 9,552,069 B2* | 1/2017 | Gilad-Bachrach | | G06K 9/00201 |
| 9,875,719 B2* | 1/2018 | Eckhoff | G06Q 30/02 | |
| 2002/0143452 A1* | 10/2002 | Losey | B60J 7/0573 | 701/49 |
| 2003/0195821 A1* | 10/2003 | Kennamer | G06Q 10/087 | 705/26.1 |
| 2004/0249497 A1* | 12/2004 | Saigh | E04H 14/00 | 700/216 |
| 2005/0261974 A1* | 11/2005 | Podratz | G06Q 20/203 | 705/22 |
| 2006/0161870 A1* | 7/2006 | Hotelling | G06F 17/00 | 715/863 |
| 2006/0197753 A1* | 9/2006 | Hotelling | G06F 1/1626 | 345/173 |
| 2007/0187183 A1* | 8/2007 | Saigh | E04H 14/00 | 186/53 |
| 2008/0309634 A1* | 12/2008 | Hotelling | G06F 1/1626 | 345/173 |
| 2010/0041337 A1* | 2/2010 | Lofton | G08G 1/096791 | 455/41.2 |
| 2010/0139990 A1* | 6/2010 | Westerman | G06F 3/0416 | 178/18.03 |
| 2010/0295809 A1* | 11/2010 | Kim | G06F 3/046 | 345/173 |
| 2011/0050618 A1* | 3/2011 | Murphy | G06F 3/04883 | 345/174 |
| 2012/0162057 A1* | 6/2012 | Tan | G06F 3/011 | 345/156 |
| 2013/0194519 A1* | 8/2013 | Ivanov | G02F 1/13338 | 349/12 |
| 2014/0062965 A1* | 3/2014 | Lee | G06F 3/0488 | 345/178 |
| 2014/0104168 A1* | 4/2014 | Hegde | G06F 3/005 | 345/157 |
| 2014/0210322 A1* | 7/2014 | Roberts | G09F 9/35 | 312/10.1 |
| 2014/0267094 A1* | 9/2014 | Hwang | G06F 3/04883 | 345/173 |
| 2014/0267130 A1* | 9/2014 | Hwang | G06F 3/0488 | 345/174 |
| 2014/0279119 A1* | 9/2014 | Knoll | G06Q 20/20 | 705/23 |
| 2015/0199018 A1* | 7/2015 | Kim | H04N 13/204 | 345/156 |
| 2015/0228004 A1* | 8/2015 | Bednarek | G06Q 30/0633 | 705/26.8 |
| 2015/0248207 A1* | 9/2015 | Dorfner | G06F 3/0488 | 345/174 |
| 2015/0258432 A1* | 9/2015 | Stafford | A63F 13/5255 | 463/32 |
| 2015/0378482 A1* | 12/2015 | Portmann | G06F 3/044 | 345/174 |
| 2016/0261250 A1* | 9/2016 | Heim | G06F 17/18 | |
| 2016/0313851 A1* | 10/2016 | Dorfner | G06F 3/0416 | |
| 2016/0313852 A1* | 10/2016 | Dorfner | G06F 3/017 | |
| 2017/0024834 A1* | 1/2017 | Peterson | G06Q 50/12 | |
| 2017/0061110 A1* | 3/2017 | Wright | G06F 21/32 | |
| 2017/0127230 A1* | 5/2017 | Enriquez | G06Q 20/40145 | |
| 2017/0185156 A1* | 6/2017 | Shotton | G06F 3/017 | |
| 2017/0300888 A1* | 10/2017 | Koralek | G06Q 20/202 | |

* cited by examiner

FIG. 11

OUTDOOR ORDERING SYSTEM WITH INTERACTIVE MENU ELEMENTS

CROSS-REFERENCE TO RELATED APPLICATION

This application claims the benefit of U.S. Provisional Patent Application Ser. No. 62/335,394 filed on May 12, 2016, the disclosure of which is expressly incorporated by reference herein in its entirety.

FIELD OF THE INVENTION

This invention relates generally to drive-through establishments where orders are taken, such as a restaurant, and more particularly to a drive-through ordering system that is interactive with the customer.

BACKGROUND OF THE INVENTION

In drive-through establishments, such as quick-service restaurant (QSR) environments, a customer drives up to an outdoor location proximate the physical building and is presented with a plurality of menu boards displaying the menu items or the items that can be ordered for pick up at a window or some other location at the establishment. The menu boards are located at the appropriate drive-through lane that usually also includes an ordering system with a speaker/microphone, and possibly a small display screen, to allow the customer to interact with an employee of the restaurant and place an order. Usually, such menu boards are presented with a series of static signs or screens mounted at the drive-through lane. A customer reads information from the various signs, and speaks with the employee taking an order through a microphone/speaker system. The employee enters the order into the system of the establishment for ultimate delivery to a customer. The items that are selected for the order might then be displayed on a small text screen to confirm with the customer what has been ordered. The customer would then proceed to a window for payment and/or pickup of the ordered items.

Such static menu screens simply display the menu items and other information, such as price, combinations, and/or current deals with the menu items. The user reads between the plurality of static signs to find what they want and then makes an order. The static signs must be manually changed if menu items are added to, or removed from, the drive-through menu. Furthermore, as deals and prices and combinations change, further signage changes are necessary. If the number of menu items is particularly large, multiple signs are necessary, creating a somewhat large land footprint at the drive-through lane. Still further, the multiple signs, labor for revisions/signage changes and other maintenance make current systems expensive to install and use.

Accordingly, it is desirable to improve upon existing drive-through order systems for more efficient engagement with a customer, and ordering of the desired items.

The accompanying drawings, which are incorporated in and constitute a part of this specification, illustrate embodiments of the invention and, together with a general description of the invention given below, serve to explain the principles of the invention. It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
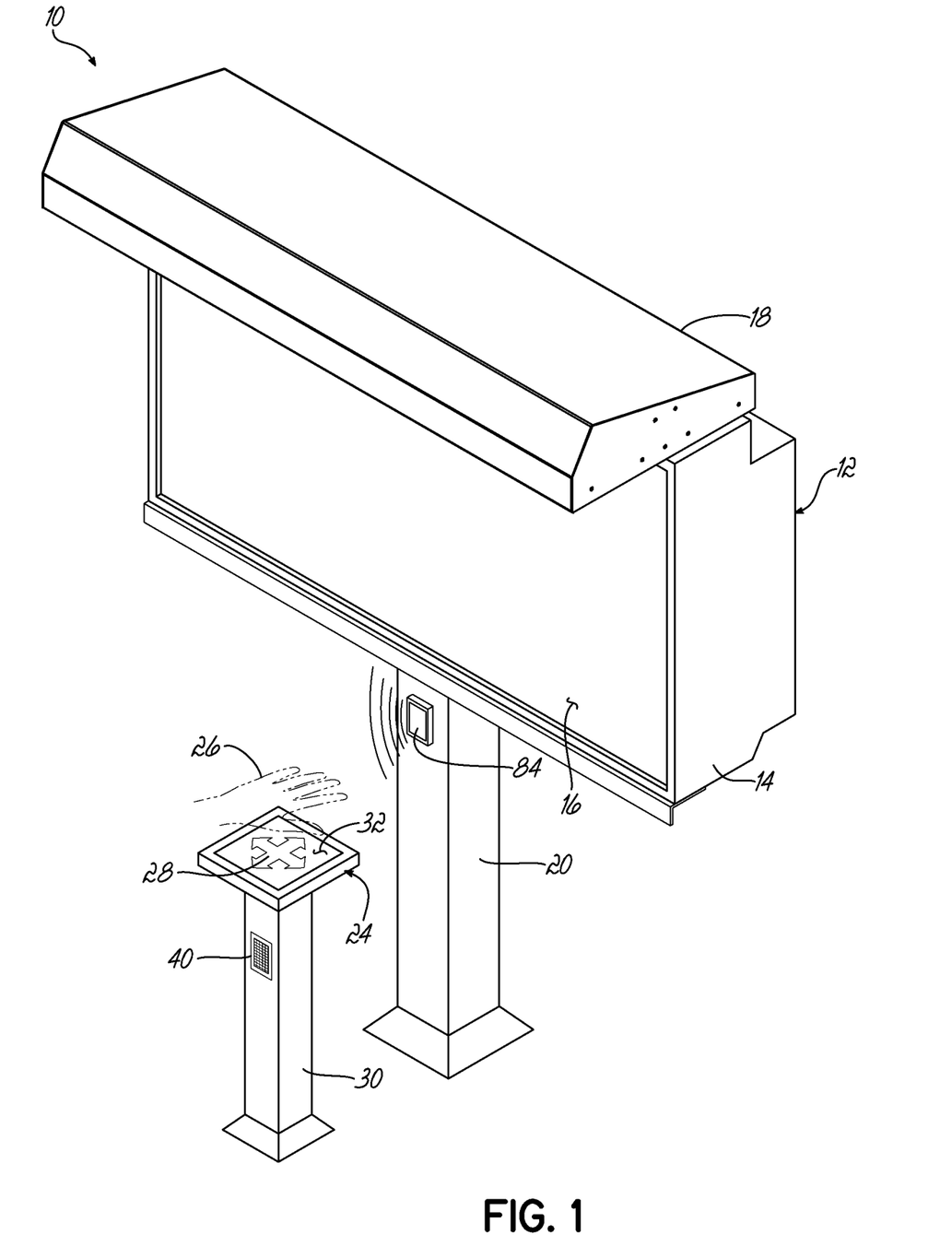
FIG. 1 is a perspective view of an ordering system having an interactive menu element, in accordance with features of the invention.
Figure 2:
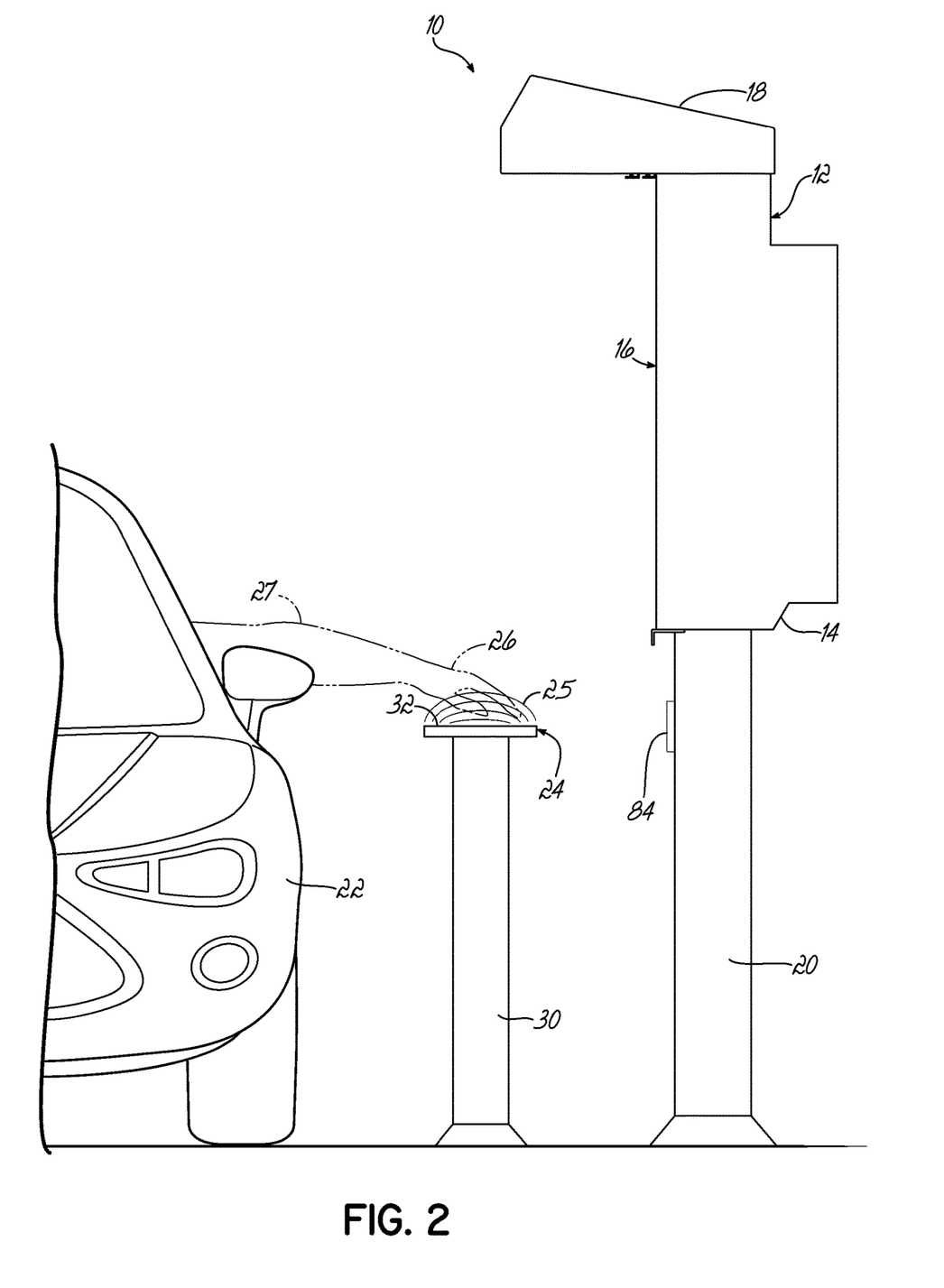
FIG. 2 is a front view of the ordering system of the invention, as illustrated in FIG. 1, showing engagement by a customer.

FIG. 1 illustrates one embodiment of an outdoor ordering system of the invention incorporating various aspects for providing one or more interactive drive-through menu elements, such as for use at a QSR or "fast food" restaurant. The outdoor ordering system 10 utilizes an interactive menu element in the form of a digital video display unit that displays menu content. The video display unit 12 includes a suitable housing 14 containing the control electronics of the unit and a screen for display. The video display unit 12 is generally mounted on a suitable support structure, such as a post 20, or other support structure, for supporting the video display unit at a proper height for usage, such as at the height of a person sitting in a vehicle. As illustrated in FIG. 2, a vehicle 22 with a customer 27 therein may pull up in front of the video display unit 12, and thus, will be exposed to the menu content that is displayed on the screen 16 of the video display unit 12. The video display unit is coupled with suitable control electronics or a control computer 80, 126 as illustrated in the figures. The control computer is configured for storing and providing data content associated with a plurality of selectable menu screens that illustrate menu items to be ordered. The control computer may be located or positioned remotely from the display unit and pad. Alternatively, the control electronics/computer may be located with the display unit or actually in the housing of the display unit.

The outdoor ordering system 10, as illustrated in FIG. 1, also incorporates an input device, such as an input pad 24, for capturing input from a customer/user 27. In one embodiment of the invention, the input pad 24 is operable for receiving an input in the form of the 3D movement of a user's hand 26 for capturing one or more of the user's gestures. As such, pad 24 is a 3D gesture-enabled pad or gesture recognition element, as discussed herein, that captures input provided by the movement of a hand 26 over the pad 24, such as in a right-left fashion, or an up-down fashion, as illustrated by graphic 28 in FIG. 1. Pad 24 will be mounted on a suitable support structure as well, such as post 30, to also be at the proper height for engagement by a user sitting in a vehicle, for example (See FIG. 2). In one embodiment of the system, as discussed herein, the pad 24 is a printed circuit board (PCB) that contains a number of electrodes that are capable of detecting gestures and movements of a hand 26 for video display control. The pad is coupled with appropriate decoding and processing circuitry. Generally, the ordering system 10 is linked with the restaurant through a larger overall system 82 as illustrated in FIG. 8 and discussed herein.

In the embodiment as illustrated in FIG. 1, screen 16 of video display unit 12 provides an interactive video display for a customer for accessing a plurality of selectable menu screens. The unit 12 is coupled with appropriate control electronics as discussed herein, for providing and controlling the content of the menu screens that are displayed through unit 12, as well as controlling the presentation of different menu screens depending on the interaction with a user through the pad 24. Specifically, in a QSR or "fast food" environment, the menu screens viewable on screen 16 of the display unit would display various food menu items that might be ordered, as well as related information (prices, combos, deals, etc.). Unlike existing systems, the video display unit 12 and screen 16 are dynamic and interactive, and thus, may be manipulated by a user for displaying a number of different selectable menu screens for different and additional menu items. For example, the menu screens and displayed menu items might be segregated by the type of food, the type of meal (breakfast, lunch, dinner), etc. As such, multiple menu screen options can be accessed through the interactive screen 16 under the control of a user/customer.

In accordance with one aspect of the invention, because the system uses video display units, the information for the presented screens can be easily and readily changed and modified. For example, new items or promotions might be added. Prices might be changed. Or different screens may be displayed for different times of day, such as for breakfast items and then lunch or dinner items. This provides an easy way to update and change the menu or order items. The user can then select any one of the selectable screens to be displayed on the display unit when ordering.

Figure 8:
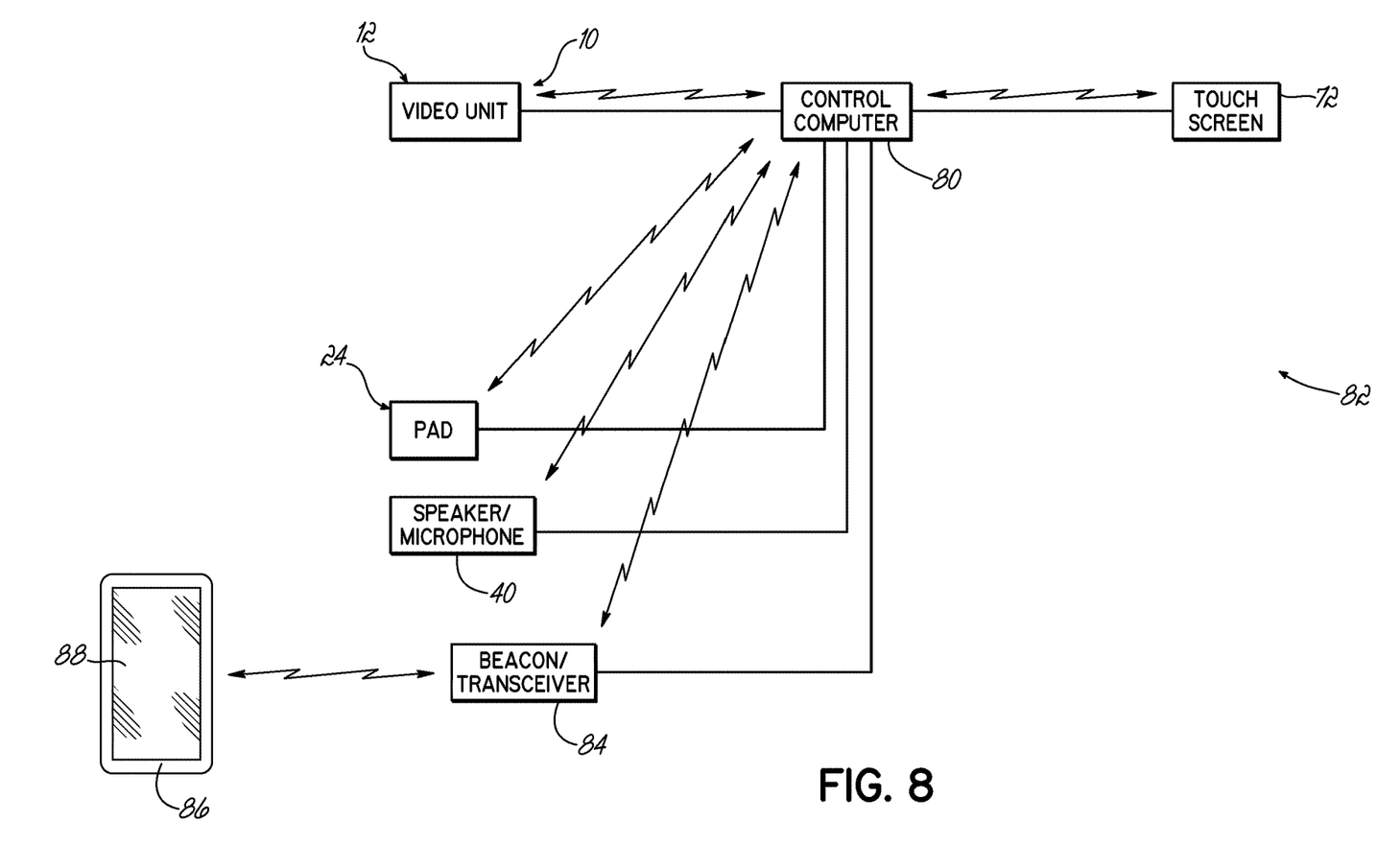
FIG. 8 is a diagram view of system components for implementing one embodiment of the ordering system of the invention.
Figure 9:
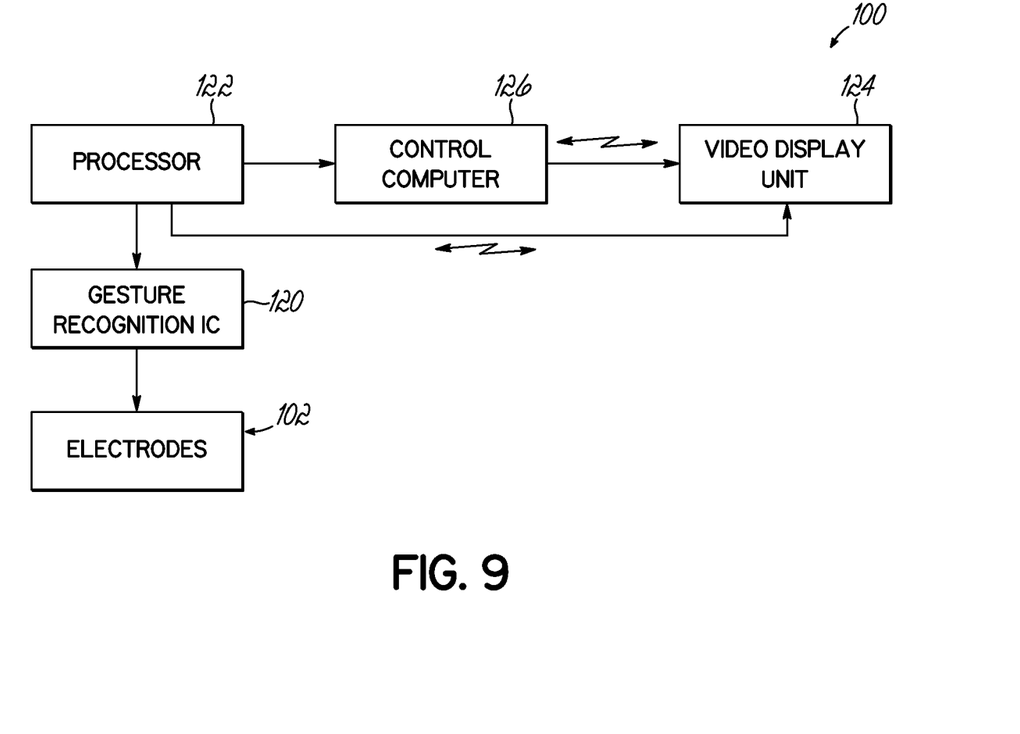
FIG. 9 is a diagram view of system components for implementing another embodiment of the ordering system of the invention.

For accessing the multiple different menu screens and content, pad 24 is operably interconnected with video display unit 12 and screen 16 through system 10, such as through control electronics or a control computer of the larger overall system 82, 100 (e.g., see FIGS. 8 and 9). The screen 16 provides the displayed content of various selectable menu screens as selected through the pad 24. For example, as shown in FIG. 8, the pad 24 may be linked to the video display unit 12 in a wired or wireless fashion through the system. FIG. 8 shows the pad 24, or other input device, coupled to control electronics 80, such as a control computer, that is part of a larger system 82 for controlling the outdoor ordering system 10. The control electronics/computer may be any suitable control apparatus as discussed below with various different processing, memory and database elements and maybe stand alone or networked. Furthermore, the control electronics as symbolized by computer 80, 126 might be distributed in various locations throughout the system 82 for implementing the invention. As noted, the control electronics may be in a remote computer separate from but linked with the display unit or could be part of the display unit. FIG. 9 illustrates one particular system for interfacing the pad 24 with a video display unit.

The input pad 24, in one embodiment, is able to detect the motion of a user's hand 26, over the pad, without contact with the pad. More specifically, pad 24 creates an RF field 25 above the top pad surface 32. Once a user's hand 26 is moved in proximity to that top surface 32, the RF field 25 is engaged and/or broken, and the pad 24 is able to detect the movement of the user's hand 26. In one embodiment of the invention, the pad 24 may be enabled to generally detect movement of the hand and the detected gesture data is processed to determine gestures that are reflective of a movement to the left or to the right, or movement of the hand toward the video unit screen 16 (up) or away from the screen (down). Such a captured movement or gesture would essentially be the capturing of a "swipe" of the user's hand 26. Pad 24 is configured and operable for detecting the direction of such a swipe as an input to the pad 24, and then processing the captured gesture data for use in control of the video display unit.

Ultimately, the gesture data is provided as an input to system 10 and/or the video display unit 12 and is further processed for providing suitable commands to the unit 12 for selecting from the plurality of screens and content. That is, the captured gesture input is then interpreted by suitable processor and/or control electronics, either in the video display unit 12, or remotely for generating commands for moving the currently displayed menu screen or other content shown on screen 16 to another displayed menu screen with different content. That is, the user 27 of the system can swipe through multiple displayed menu screens of content that are presented on the screen 16 of video display unit 12. If a swipe gesture is detected, the current menu screen disappears or is swept away and a new menu screen is displayed. Each new menu screen may come into view on screen 16 from either the right or left of screen 16, or from the top or bottom of screen 16, depending up the user's gesture swipe that is captured by pad 24 and depending on how the menus are presented. Alternatively, the current menu screen might disappear with the detected gesture and a new menu screen might appear. Using the various selectable menu screens of the interactive video display unit, a user 27 may then view menu screens with different content, and order one or more food items or other items through the system 10.

To that end, system 10 further includes a speaker/microphone unit 40 shown in FIG. 1 as positioned on post 30. The speaker/microphone might also be positioned on post 20, and the system is not limited to the displayed embodiment of FIG. 1. The speaker/microphone unit 40 may be a commercially available unit or system, as would be understood by a person of ordinary skill in the art. For example, a user 26 might order some menu items from one displayed menu screen, and then move their hand in a gesture over pad 24 in order to move to another menu screen, and order items from that displayed menu screen. The user can move back and forth, or through all the available display menu screens to view the various menus and content. As may be appreciated, the content displayed is somewhat limitless based on presentable screens. As such, the invention provides interaction between the user and screen 16 of ordering system 10 for viewing, selecting, and ordering menu items. As will be appreciated by a person of ordinary skill in the art, system 10 prevents the need for a large number of static boards or menus and signage, and separate support structures to display all of the menu content, as well as reduces the footprint required for land at a drive-through area for accommodating a large number of separate static boards and signs. Furthermore, a greater amount of menu content may be presented to a customer at a reduced overall system cost. Additionally, the content and information to be displayed on the screen 16 of the video unit may be easily and cost-effectively updated or changed or added to, as necessary. As discussed below, a database of the control electronics 80 of system 82 might store the content for the various selectable menu screens and may be readily and efficiently changed and updated as necessary for display.

In accordance with one embodiment of the invention, screen 16 of video display unit 12 might be a 55-inch screen (e.g., SAMSUNG OH55D) that is oriented in landscape orientation, as illustrated in FIG. 1. Various suitable digital display screens or monitor screens are commercially available, and may be suitable for such usage. Of course, the present invention is not limited to the size of screen 16, or the type of video display unit 12.

Pad 24 might be implemented using a series of electrodes and an electrical mirror field (E-field) 3D gesture controller 120, such as the MGC 3030/3130 controllers available from Microchip Technology, Inc. of Chandler, Ariz. The pad 24 provides both touch and gesture interaction with a user's hand 26 from the 0 cm. (touch) to around 30 cm. detection range. Accordingly, in one embodiment of the invention, just a gesture is necessary for selecting an available display screen. Alternatively, in another embodiment, the user might touch the pad as well for recording an input or gesture, such as a hand swipe.

Figure 10:
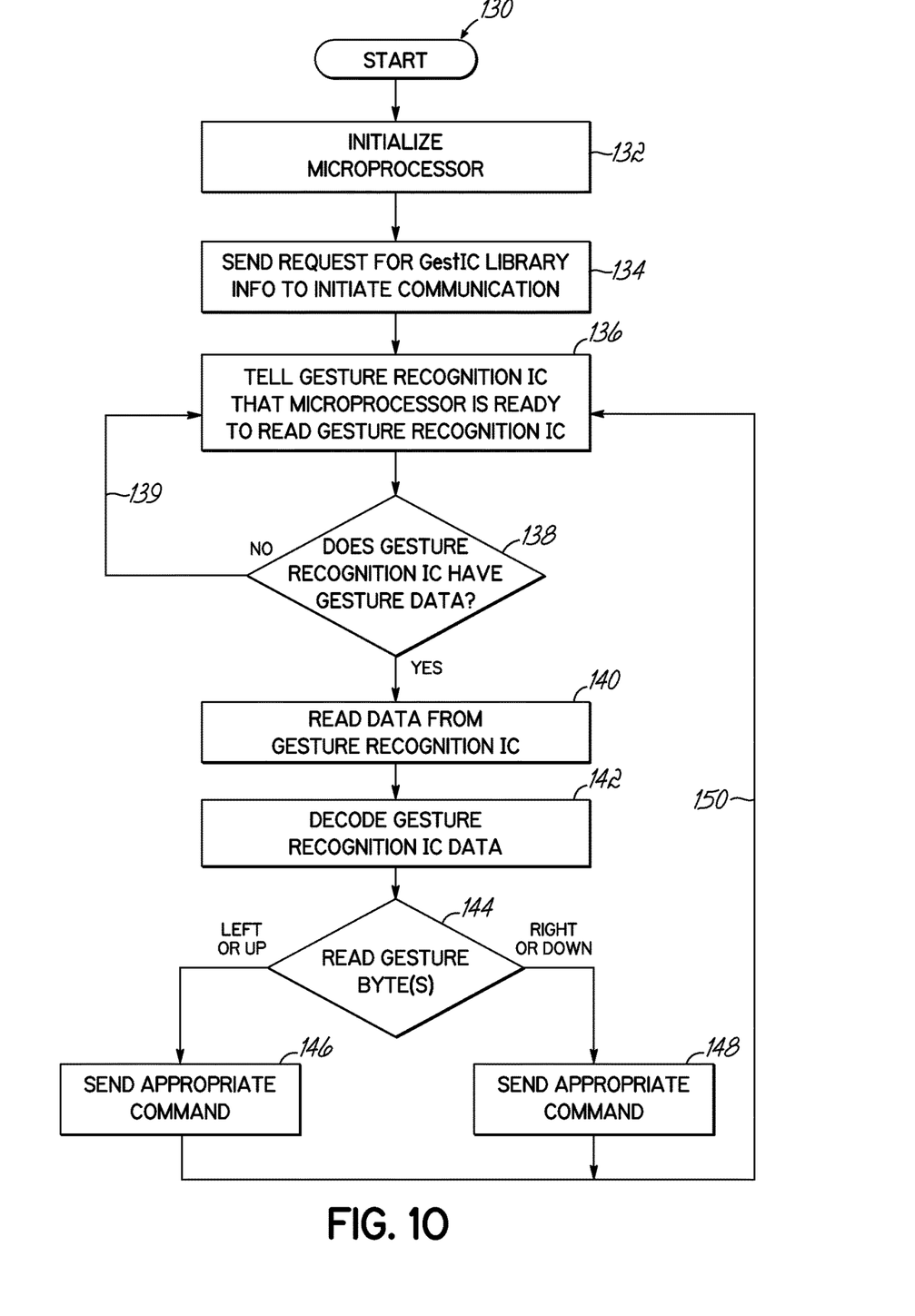
FIG. 10 is a flowchart for program control of the system of FIG. 9.
Figure 11:
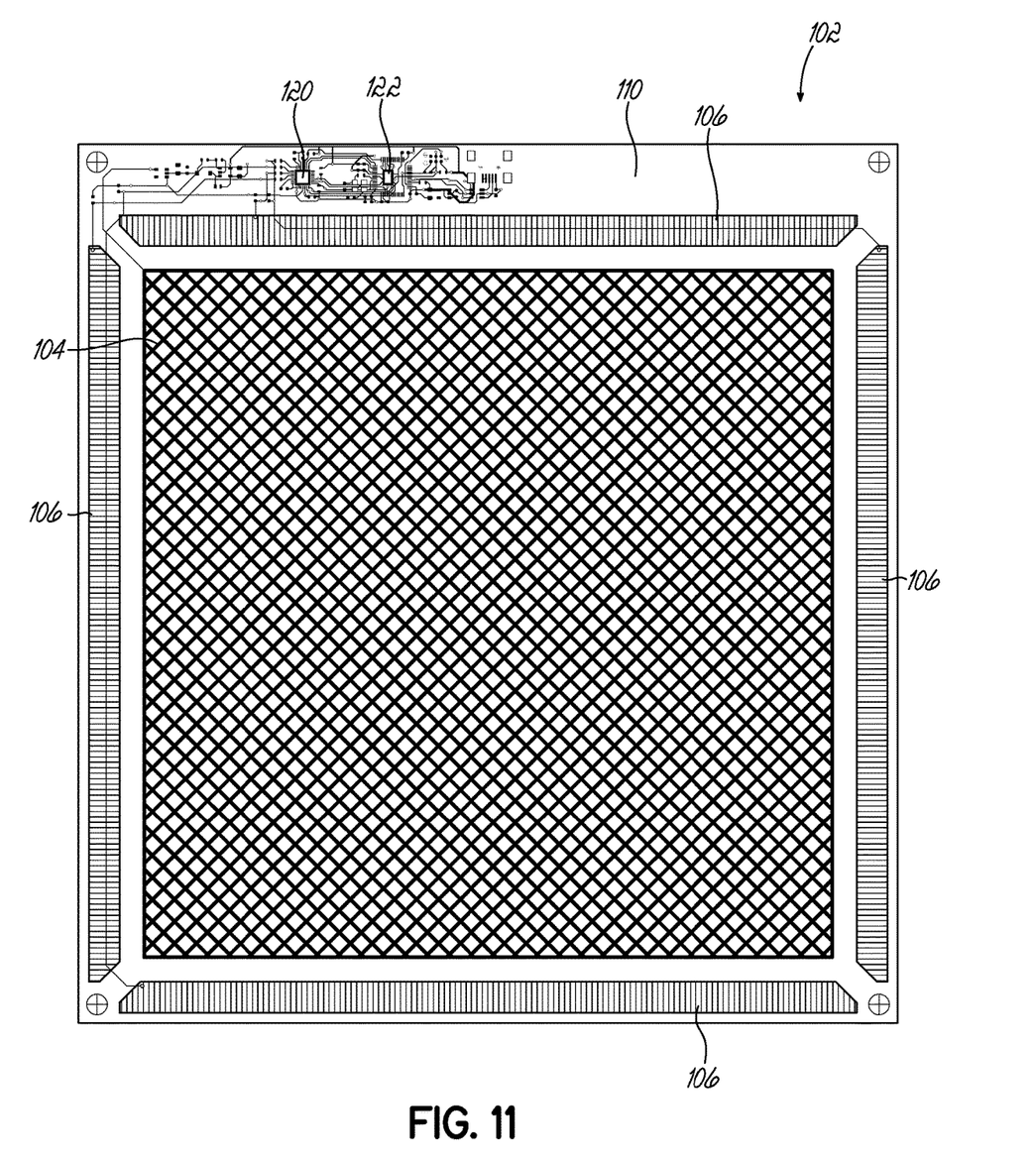
FIG. 11 is a plan view of electrodes and circuitry for the gesture recognition features of the invention.

FIGS. 9-11 illustrate one embodiment of components of a system 100 for implementing the invention using gesture recognition. Specifically, system 100 includes elements for implementing the functionality of a gesture recognition system, that includes a sensor, such as pad 24 within an ordering system. In accordance with one aspect of the invention, for detecting a series of gestures or movements of a user's hand, a plurality or set of electrodes are implemented on a board over which a user's hand is moved. Specifically, referring to FIG. 11, the electrode set 102 may incorporate one or more transmission electrodes 104 and one or more sensing or receive electrodes 106 positioned proximate to the transmission electrode 104 that act as a sensor to detect 3D movement of the hand of a user, such as a gesture, over the pad. In accordance with one embodiment of the invention, the electrodes are arranged and configured to increase the detection range of a gesture out to around 12 inches from the pad.

More specifically, the electrodes are positioned in the same plane on a circuit board. Referring to FIG. 11, the electrodes, such as in the form of conductive metal patterns (e.g., copper patterns) are positioned on a first surface of a printed circuit board PCB 110 and may be implemented as microstrip elements on that surface. The electrodes are used with a conductive ground plane (e.g., copper plane) on the other surface or side if the PCB (not shown) as is known in microstrip circuit design. By using the electrodes 104, 106 in the same plane or on the same surface, the range of gesture detection is increased versus having the electrode 104 and the electrodes 106 on different planes with respect to the ground plane. This provides desirable range for users that may be reaching out of a car to engage the pad for ordering.

In accordance with one embodiment of the invention as illustrated in FIG. 11, the transmission electrode is in the form of a grid pattern having a square shape as illustrated, for example a grid of 168 mm×168 mm. The receive electrodes 106 are elongated solid electrodes and are positioned along the various sides of the transmission electrode. That is, with respect to a square or rectangular transmission electrode 104, the receive electrodes 106 are positioned north and south (up and down) and east and west (right and left) with respect to the transmission electrode 104 and may be approximately 180 mm×80 mm each. In the gesture recognition system, the electrodes 104, 106 are excited to generate electric fields under the control of a gesture recognition integrated circuit or gesture controller 120. The changes to the fields due to the passage of a user's hand over the board 110 are detected and the field changes and input signals from that electrodes that are associated with the gesture are then processed with respect to a library of detectable gestures in the gesture recognition IC 120. The field changes and associated input signals that are created are translated into gesture data and into a suitable processor language (e.g., I2C) for interfacing with a processor circuit 122. The processor circuit then processes the gesture data further into appropriate commands for use with one or more video display units 124.

As noted, one suitable system might use a gesture recognition circuit including an MGC 3030/3130 controller available from Microchip Technology that implements GestIC technology for sensing gestures from the electrodes 102. The GestIC technology includes a library for gesture recognition based on the inputs from the plurality of electrodes and detected field conditions. One suitable processor 122 for system 100 might be a STM32 from STMicroelectronics of Geneva Switzerland. The processor, as noted, uses the gesture data generated by the electrodes and gesture recognition circuit/controller and processes the data for determining the gesture that was detected and then generating the appropriate commands to control the screens of the display unit.

The processor 122 might communicate directly with a video display unit 124 in a wired or wireless fashion to control the unit if the control electronics for the display unit are in the display unit. Alternatively, the processor might provide data to a separate control computer or control electronics 126 that then controls the video display unit(s) 124 through a wired or wireless link. In one embodiment of the invention, the processor 122 and control electronics 126 and display unit 124 are coupled with appropriate HDBaseT components and Cat 5 links for getting commands to the electronics and controlling the screens of the display unit appropriately. Referring to FIG. 11, the gesture recognition integrated circuit 120 and the processor circuit 122 might be implemented onto board 110 along with the electrodes 104, 106 and the unit might be positioned as shown by pad 24 in the Figures.

FIG. 10 illustrates a flow chart for one embodiment of the invention for reading gestures of a user and controlling the video display units. Specifically, the process flow starts (block 130) and the processor circuit 122 is initialized (block 132). The processor circuit 122 sends a request to the gesture recognition integrated circuit 120 for data and information associated with the gesture recognition library associated with circuit 120 in order to initiate communication between the two components (block 134). The gesture recognition integrated circuit 120 is informed that the processor circuit is ready to read or receive data obtained based upon a detected gesture or movement over the electrodes (block 136). As illustrated, the processing flow is in a loop 139 until the gesture recognition integrated circuit 120 indicates it has gesture data (block 138). If a user waves or moves their hand over the electrodes of the pad 24, the electric fields are affected and appropriate input signals are generated. The gesture recognition circuit or controller processes that input signals and generates the gesture data that is then read by the processor circuit (block 140).

The data is then decoded to determine the movement of the user's hand and the direction to control the video display units (block 142). In accordance with one aspect of the invention, the data includes a plurality of gesture bytes within the data. For the purposes of controlling the video display units in a scrolling fashion in accordance with the invention, the processor circuit is configured to review a reduced number of gestures of the gesture inventory for ensuring proper video display control. More specifically, the processor circuit 122 reviews those gesture bytes (block 144) and byte combinations that indicate a movement to the left or to the right in order to scroll the video display screens in those directions while ignoring other gesture data of the gesture bytes so as to efficiently provide the desired scrolling. Alternatively, the processor circuit may review those gesture bytes and combinations that indicate a movement up or down in order to scroll the video display screens in those directions. The processor circuit then sends the appropriate commands (block 146 or 148) for controlling the video display units. As illustrated, the process flow continues to loop as referenced at 150 in order to capture gestures for video screen control in accordance with the invention. The processor is configured to ignore some of the other gesture byte combinations with respect to detected gestures as the invention focuses upon efficient scrolling of the video display unit screens.

In accordance with another aspect of the invention, screen 16 of unit 12 can also be used to display order confirmation once an order has been initiated. As such, screen 16 serves a dual purpose of providing both the display of menu content for ordering, as well as confirmation of an order that has been placed. Current systems require a separate display for confirmation in addition to any static displays or boards that show menu items. Furthermore, with the invention, confirmation might be provided in a video fashion, rather than just text, as is done with current order confirmation. This increases accuracy in the ordering process as it allows the customer to view specifically what they selected.

Figure 3:
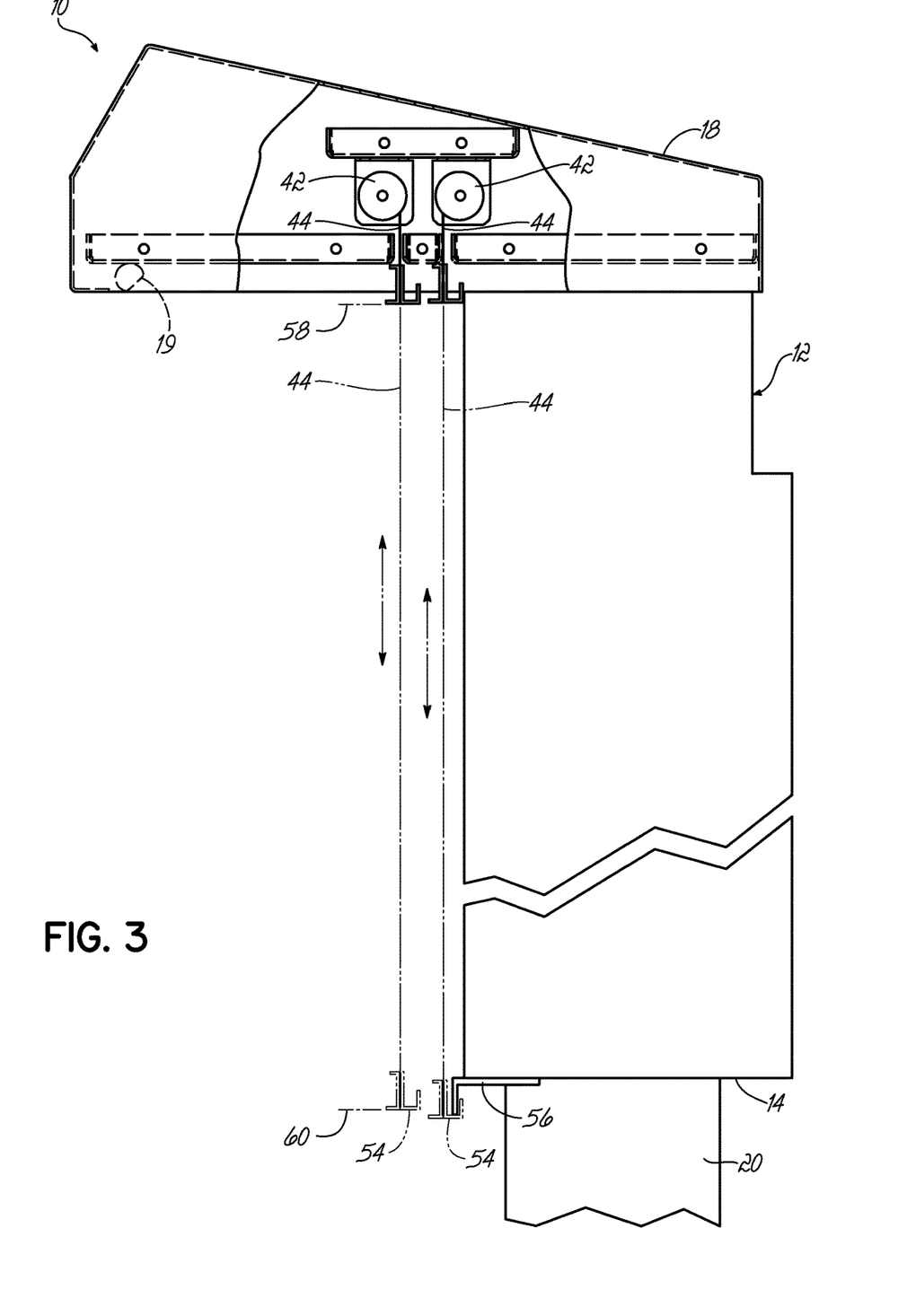
FIG. 3 is a side view, in partial cross-section, of an interactive menu element and hood.

In accordance with another aspect of the invention, the video display unit 12 includes a hood 18 that provides weather protection for screen 16, and extends horizontally over the screen, as illustrated in the figures. Hood 18 includes an elongated LED light, such as an LED Linear Strip Light Luminaire, available from LSI Industries of Cincinnati, Ohio, USA. The LED Luminaire 19, as illustrated in FIG. 3, will be directed to illuminate screen 16, as necessary, such as when static menu banners are implemented on unit 12 as discussed herein. In accordance with another aspect of the invention, hood 18 also provides an alternative use of the video display unit 12 and screen 16 of system 10, such as when, for example, the video display unit 12 malfunctions, and suitable video images may not be displayed on screen 16 and the screen is dark.

Figure 1A:
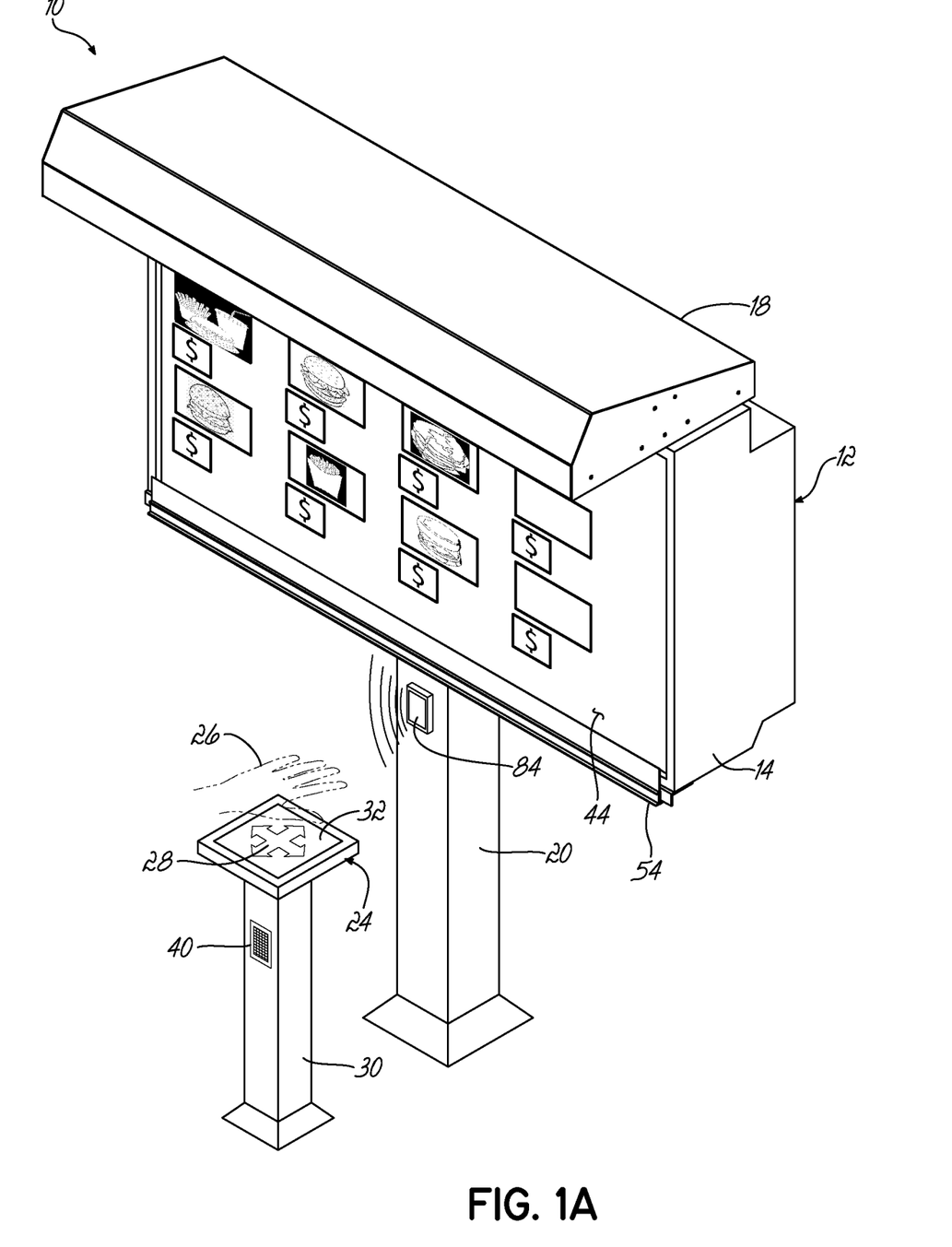
FIG. 1A is an alternative perspective view of an ordering system of the invention.
Figure 5:
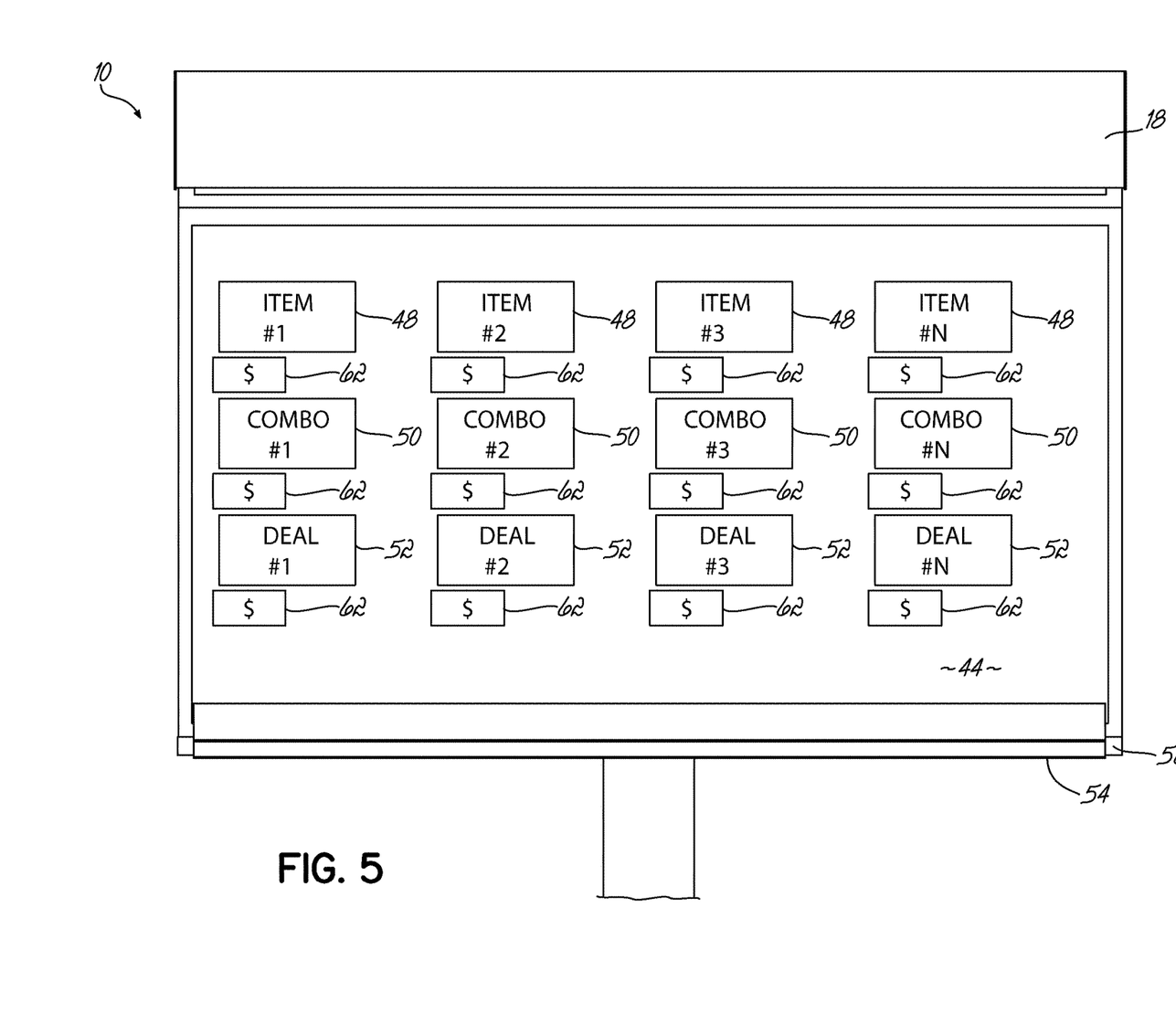
FIG. 5 is a front view of the interactive menu element of the ordering system incorporating optional static signage.
Figure 7:
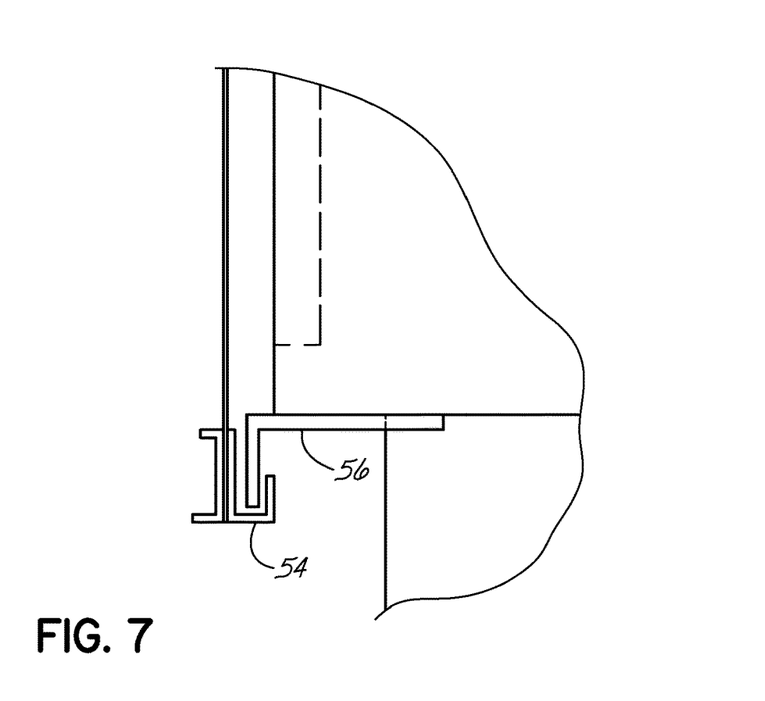
FIG. 7 is a partial cross-sectional view of engagement of the static signage of FIG. 5, with an interactive screen of the invention.

To that end, as illustrated in FIG. 3, hood 18 incorporates one or more spring rollers 42 that incorporate fabric menu shades or banners 44 that may be drawn down as needed, as illustrated in FIG. 3. The menu banners provide desirable menu signage in the form of suitable graphics that may show menu items 48, menu combo items 50, or menu deal items 52, as illustrated in FIGS. 1A and 5. FIG. 1A illustrates a menu banner 44 pulled down over screen 16 to be viewed by a customer when screen 16 cannot display video menu screens. As such, the multiple rollers and banners 42, 44 may provide supplemental static menu screens or signage that may still be displayed utilizing the housing of the video display unit 12 of the system, when that unit 12 or screen 16 is not functioning. To that end, each of the banners 44 will incorporate attachment structures 54, such as hook structures, as illustrated in FIG. 3, to hold the banners in place. The attached structures may be engaged with a suitable latch element 56, as shown in FIG. 3. FIG. 1 shows an exposed video screen 16, wherein the menu banners 44 of hood 18 are up and wound around the rollers, as shown with respect to the position 58 in FIG. 3. FIG. 1A discloses one banner 44 being drawn down to cover screen 16, and expose the menu items and graphics on the banner 44, as evidenced by positioned 60 in FIG. 3. Once the menu banners 44 are in the drawn position 60, and appropriately secured, such as by the hook structures 54 and latch element 56, the static graphics provide a customer with items that may be ordered. The light provided by element 19 in hood 18 illuminates the banners 44. This allows use of system 10, even if the video unit is not working. In accordance with another aspect of the invention, the menu banners 44 may include writeable fields 62 for each menu item, wherein prices may be written with suitable instruments, such as erasable markers or grease pens to reflect current pricing of items. As illustrated in FIGS. 1A and 5, the hook structures 54 and latch element 56 would generally extend substantially across the bottom edge of the banners 44 and screen 16 for proper securement of the menu banners in a taut and flat manner for viewing. The menu banners may be made of an appropriate material, such as a vinyl laminate in order to stand up in the weather. FIG. 7 shows a close-up view of the engagement between the hook structures 54 and the latch element 56, although the invention is not limited to the particular securing structure and another structure might be utilized for securing the menu banners in the engaged position 60 (See FIG. 3).

The menu banners may be updated from time to time with new information, such as new menu items, new combination offerings and new prices. To that end, the rollers 42 are removable and may be fitted with new banners 44 with the new information. In that way, the menu may be kept updated in those situations wherein it is necessary to use the banners.

Figure 4:
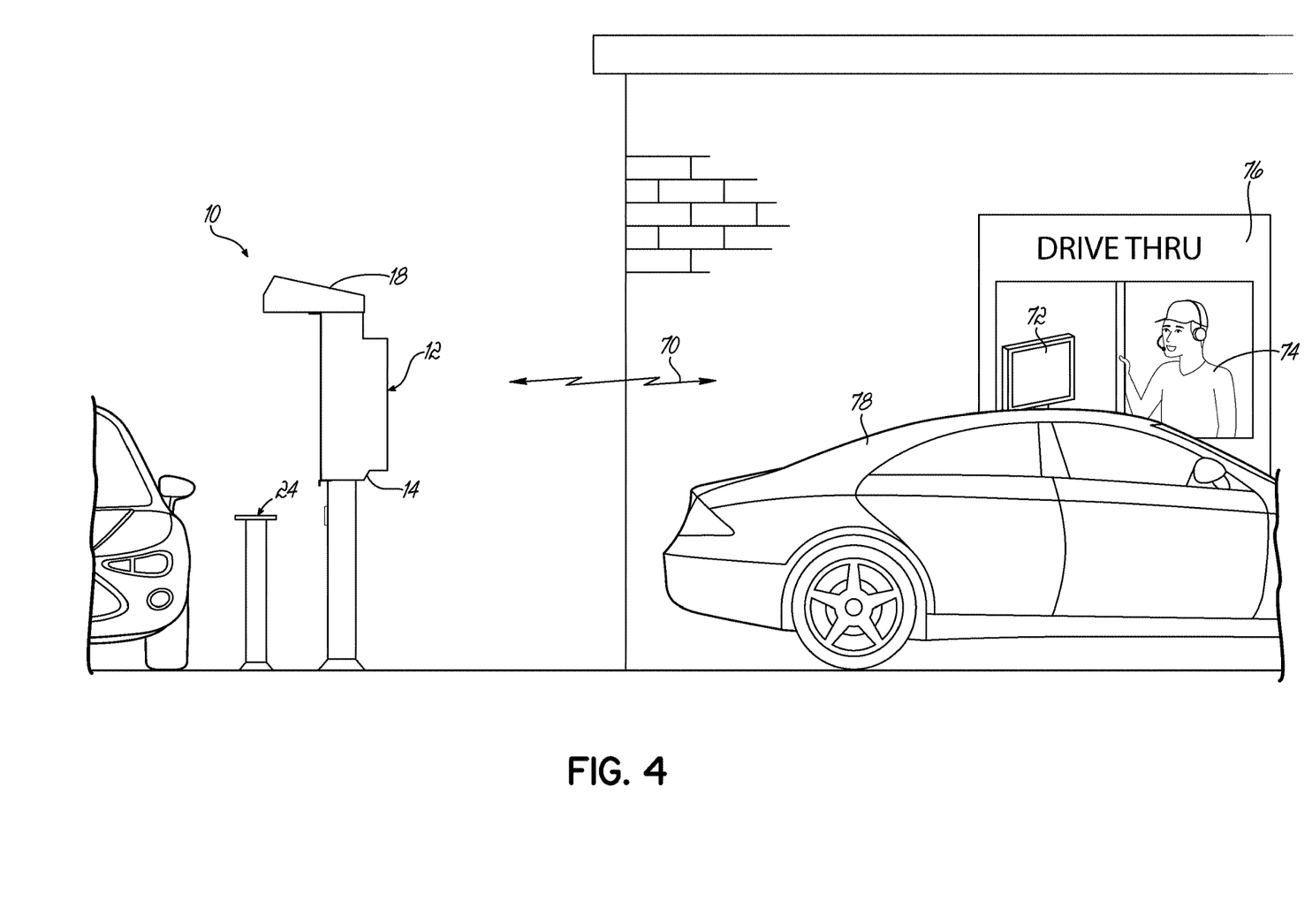
FIG. 4 is a perspective view of the ordering system of the invention, as incorporated with a restaurant facility.

In accordance with another feature of the present invention, the control electronics of the system 82 might link the ordering system 10 with another display, such as the computer/touch screen display 72 of a food service worker or order taker, as shown in FIG. 8. The content on screen 16 is then duplicated or mirrored on one or more other computers and screens 72. To that end, the specific selectable display screen and its contents, as selected by a user, will be displayed on screen 16, as well as on another screen 72. FIG. 4 illustrates the link 70 between system 10 and an order screen 72 viewed by a worker 74 at the drive-through window 76 or other location. Generally, screen 72 may be a touch screen that the worker 74 can utilize with the computer device associated with the touch screen 72 to make the order based upon verbal commands received from the customer through the speaker/microphone 40. The worker may also be doing other tasks, such as taking money from another vehicle and user 78, who had previously ordered.

To provide connectivity of other elements of the system 82 with ordering system 10, FIG. 8 illustrates components or elements that might be used to implement the system, including electronic control or processing elements, such as a control computer 80 that operate based on program code for implementing features of the invention. Through system 82, the ordering system 10 may be coupled with a remote touch screen 72, and other elements, in either a wired or wireless fashion, as appropriate. Although control computers 80, 126 are illustrated as separate, centralized elements, the control electronics for the system of the invention may be incorporated at various location in the system 82, 100 or in sub system 10, such as outside by the customer, or with the touch screen 72 inside with the worker, or any other location as appropriate for convenience and cost, etc. As such, the location of the various control electronics and elements, as illustrated in the drawing Figures, is not limiting to the invention.

For the purposes of the invention, electronic control element or control computer 80, 126 may represent practically any computer, computer system, server or programmable device, e.g., multi-user or single-user computers, desktop computers, portable computers and devices, handheld devices, network devices, servers, mobile phones, etc. Apparatus 80, 126 will sometimes be referred to herein as a "computer" although it should be appreciated that the term may also include other suitable programmable electronic devices or control electronics. As such computer elements and control electronics are available commercially in a variety of forms, the specific elements or contents making up such electronic control element or control computer 80, 126 are not separately shown.

Computer 80, 126 typically includes at least one processor that is coupled to a memory. The processor may represent one or more processors (e.g. microprocessors), and memory may include the random access memory (RAM) devices comprising the main storage of computer 80, 126 as well as any supplemental levels of memory, e.g., cache memories, non-volatile or backup memories (e.g. programmable or flash memories), read-only memories, etc. In addition, memory may be considered to include memory storage physically located elsewhere in computer 80, 126 e.g., any cache memory in a processor, as well as any storage capacity used as a virtual memory, e.g., as stored on a mass storage device or another computer that might be coupled to computer 80, 126 via a network (not shown). Generally, memory will be used to store the menu contents and other information that is used to create the various menu screens that can be displayed in the invention.

Computer 80, 126 also typically receives a number of inputs and outputs for communicating information externally. For interface with a user or operator, computer 80, 126 typically includes one or more user input devices (e.g., a touch screen, a keyboard, a mouse, a trackball, a joystick, a touchpad, a keypad, a stylus, and/or a microphone, among others). Computer may also include output devices such as a display (e.g., a touch screen, a CRT monitor, an LCD display panel) and/or a speaker, among others elements. The interface to computer 80, 126 may also be through an external terminal or element (not shown) connected directly or remotely to computer, or through another computer communicating with computer 80, 126 via a network, modem, or other type of communications device.

The computer 80, 126 or other control electronics will operate under the control of an operating system, and executes or otherwise relies upon various computer software applications, components, programs, objects, modules, data structures, etc. (e.g. database application). The applications may further include database queries for querying one or more databases. For example, a database may store the content for the various selectable menu screens that are to be displayed on screen 16. Computer 80 may communicate on a network or with the other components through a suitable network interface or other interfaces.

In general, the routines executed to implement the embodiments of the invention, whether implemented as part of an operating system or a specific application, component, program, object, module or sequence of instructions may be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in the Figures, such as FIG. 8, 9, is not intended to limit the present invention. Indeed, those skilled in the art will recognize that other alternative hardware and/or software environments may be used without departing from the scope of the invention.

In another embodiment of the invention, there may be multiple other user computers and associated screens 72 that will display what is displayed on screen 16 and selected by the user through pad 24. As such, the invention is not limited to the number of computers and screens 72 for the duplication of the displayed selection on screen 16, such as in other areas of the restaurant. Touch screen 72, in addition to being a touch screen for the purposes of ordering taking, may also be used to control screen 16 and the content thereon, in order to aid the customer as necessary. Therefore, a worker has the ability, through touch screen 72 in the overall system 82, as illustrated in FIG. 8, to also control the content of screen 16 displayed to the user and assist in the ordering process. The swipes on touch screen 72 would be used to display different menu screens on the screen 16 of unit 12.

In accordance with another aspect of the invention, although a single video display unit 12 and screen 16 is illustrated in the Figures, the invention is not limited to a single unit/screen. Alternatively, multiple units/screens may be used in system 10. Because multiple display screens of content are available and selectable to be displayed on screen 16, multiple units may not be necessary, but the invention also anticipates one or more units 12/screens 16 to be used in accordance with features of the invention.

Figure 6:
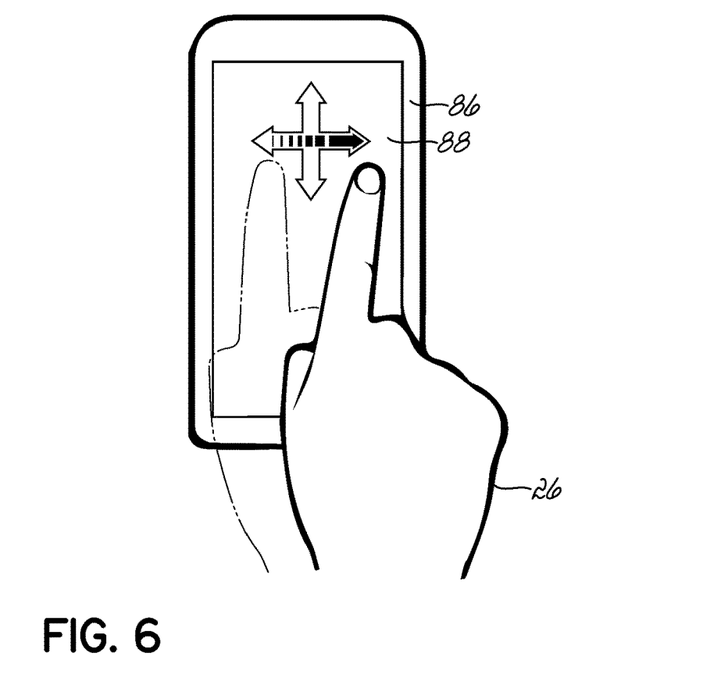
FIG. 6 is a perspective view of a mobile device for use with the ordering system of the invention.

In accordance with another aspect of the invention, the selectable content on menu screens shown on screen 16 may also be interactively selected and controlled in other ways by a user. For example, a mobile device of a user might be implemented. To that end, as illustrated in FIGS. 1 and 8, system 10 incorporates a beacon/transceiver element 84 that is positioned proximate to unit 12 and screen 16, such as on post 20. The beacon/transceiver element 84 might also be located on post 30, or somewhere proximate to the system 10 for short-range communication with a mobile device, such as mobile device 86 illustrated in FIGS. 6 and 8. Mobile device 86, such as a mobile phone or pad or other appropriate mobile device, would generally communicate via a wireless link with the beacon/transceiver element 84 using a suitable short-range protocol, such as Bluetooth or Zigbee. Mobile device 86 will run an application or "app" associated with the restaurant establishment, such as an app sponsored by and controlled by the restaurant. This app is loaded onto device 86 in typical fashion, such as through an app store. Upon coming in proximity to system 10 and beacon/transceiver 84, such as by driving up to the order location as illustrated in FIG. 2, the beacon/transceiver element 84 is operable to send signals to contact mobile device 86 through the suitable wireless link. The app on the mobile device 86 then connects the touch screen 88 of the mobile device 86 with the overall system 82, and particularly with the interactive system 10 for the purposes of ordering. The system 82 mirrors the menu contents displayed on screen 16 onto the screen 88 of the mobile device. The device 86 may also be used to interact with the screen 16. The touch screen 88 of device 86 captures swipes and inputs to select and display different menu screens on screen 16. As such, various selectable menu screens and menu content that may be displayed on screen 16 are also displayed on screen 88. Furthermore, the content on screen 16 may be manipulated through the touch screen 88 of the mobile device. As illustrated in FIG. 6, the touch screen gesture of the user's hand 26 may be used to change the menu screens displayed on screen 16 with movements left or right, and up or down, as suitable for the control of screen 16. In that way, system 10 has an alternative input element to pad 24 for manipulating the displayed content on screen 16, in accordance with the invention. The user can then select a menu screen through the mobile device 86, and it will be displayed on screen 16 as well as screen 86, and the user may then use that displayed content to place an appropriate order of one or more menu items.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. An ordering system for a drive up facility including at least one vehicle lane to receive a vehicle having one or more users therein, the ordering system comprising:
   a video display unit positioned proximate the at least one vehicle lane, the video display unit viewable by a user in a vehicle in the vehicle lane and operable for displaying contents of at least one of a plurality of menu screens;
   an input pad positioned proximate to the at least one vehicle lane and reachable by a user in a vehicle in the vehicle lane, the input pad including a circuit board having at least one transmission electrode and at least one receive electrode operable for creating an electrical field over the surface of the input pad, the input pad positioned to allow the user in a vehicle in the vehicle lane to hover a hand over the at least one receive electrode and configured for detecting at least one non-contact movement gesture of only the user's hand out to 30 centimeters that disturbs and changes the electrical field over the surface of the input pad without requiring an electronic circuit in the user's hand or user contact of the input pad, the input pad providing non-contact input signals that are associated with the at least one detected non-contact movement gesture of only the user's hand;
   a gesture recognition circuit coupled with the input pad and configured for processing the captured non-contact input signals with respect to a library of human hand gestures and generating gesture data associated with the at least one non-contact movement gesture from the user's hand;
   processing circuitry configured for decoding the gesture data and determining the non-contact movement gesture from the user's hand, the processing circuitry generating one or more movement commands based upon the determined non-contact movement gesture;
   control electronics coupled with the video display unit and processing circuitry and operable for providing a plurality of selectable menu screens visible to a user in a vehicle in the vehicle lane, the control electronics using the generated movement commands to control the video display unit and provide for movement of at least one of the plurality of selectable menu screens on the video display unit coinciding with the movement gesture from the user's hand for a user to select which menu screen to display by the video display unit.

2. The ordering system of claim 1 wherein the input pad includes a plurality of receive electrodes for creating the electrical field.

3. The ordering system of claim 2 wherein the transmission electrode includes sides and the receive electrodes are positioned on the plurality of the sides of the transmission electrode.

4. The ordering system of claim 1 wherein the transmission and receive electrodes are in the same surface of the circuit board.

5. The ordering system of claim 1 wherein the control electronics are positioned with the video display unit.

6. The ordering system of claim 1 wherein the control electronics are positioned remotely from the video display unit.

7. The ordering system of claim 1 further comprising a touch screen device configured for displaying the at least one of the plurality of selectable menu screens that has been selected for display by the video display unit.

8. The ordering system of claim 7 wherein the touch screen device is operable for providing an input to select at least one of the plurality of selectable menu screens for display by the video display unit.

9. The ordering system of claim 1 further comprising:
   a mobile device having a touch screen;
   a beacon device coupled with control electronics and including a transceiver element configured for providing a wireless communication signal for a wireless link that links the touch screen of the mobile device with the video display unit for selecting at least one of the plurality of selectable menu screens for display by the video display unit.

10. An ordering system for a drive up facility including at least one vehicle lane to receive a vehicle having one or more users therein, the ordering system comprising:
a video display unit positioned proximate the at least one vehicle lane, the video display unit viewable by a user in a vehicle in the vehicle lane and operable for displaying contents of at least one menu screen;
a gesture recognition system positioned at least partially proximate the at least one vehicle lane and reachable by the user in a vehicle in the vehicle lane, the gesture recognition system operable for capturing at least one non-contact 3D gesture of only the user's hand by detecting at least one non-contact 3D movement gesture of only the user's hand out to 30 centimeters that disturbs and changes an electrical field over the surface of an input pad without requiring an electronic instrument in the user's hand or user contact of the input pad, the input pad operable for creating non-contact input signals that are associated with the at least one detected non-contact 3D movement gesture of a user's hand, the gesture recognition system operable for processing the input signals with respect to a library of human gestures and generating gesture data associated with the detected non-contact 3D movement gesture from the user's hand;
processing circuitry configured for processing the non-contact gesture data and determining the non-contact 3D movement gesture from the user's hand, the processing circuitry generating one or more movement commands based upon the determined non-contact 3D movement gesture;
control electronics coupled with the video display unit and processing circuitry and operable for providing a plurality of selectable menu screens visible to a user in a vehicle in the vehicle lane, the control electronics using the generated movement commands to control the video display unit and provide for movement of at least one of a plurality of menu screens on the video display unit coinciding with the movement gesture from the user's hand for a user to select which menu screen to display by the video display unit.

11. The ordering system of claim 10 wherein the gesture recognition system input pad includes a circuit board having at least one transmission electrode and a plurality of receive electrodes operable for creating the electrical field, the input pad configured for detecting the at least one non-contact 3D movement gesture of the user's hand that disturbs and changes the electrical field over the surface of the input pad without requiring an electronic instrument in the user's hand or user contact of the input pad, the system further including a gesture recognition circuit configured for processing the non-contact input signals and generating gesture data associated with the at least one non-contact 3D movement gesture of the user.

12. The ordering system of claim 10 wherein the control electronics are positioned with the video display unit.

13. The ordering system of claim 10 wherein the control electronics are positioned remotely from the video display unit.

14. The ordering system of claim 10 further comprising a touch screen device configured for displaying the at least one of the plurality of selectable menu screens that has been selected for display by the video display unit.

15. The ordering system of claim 14 wherein the touch screen device is operable for providing an input to select at least one of the plurality of selectable menu screens for display by the video display unit.

* * * * *